United States Patent [19]
Simon

[11] Patent Number: 6,008,936
[45] Date of Patent: Dec. 28, 1999

[54] GRAZING ANGLE MICROSCOPE

[75] Inventor: Arno Simon, Karlsruhe, Germany

[73] Assignee: Bruker Analtik GmbH, Rheinstetten, Germany

[21] Appl. No.: 09/178,505

[22] Filed: Oct. 26, 1998

[30] Foreign Application Priority Data

Nov. 4, 1997 [DE] Germany ............................ 197 48 552

[51] Int. Cl.[6] .................................................. G02B 21/00
[52] U.S. Cl. .......................... 359/370; 359/371; 356/359; 356/360
[58] Field of Search ..................................... 359/370, 371, 359/372; 356/354, 357, 359, 360

[56] References Cited

U.S. PATENT DOCUMENTS

| | | | |
|---|---|---|---|
| 2,674,157 | 4/1954 | Heine | 359/370 |
| 4,317,613 | 3/1982 | Grosser | 359/370 |
| 4,810,077 | 3/1989 | Sting . | |

*Primary Examiner*—Robert H. Kim
*Attorney, Agent, or Firm*—Dr. Paul Vincent

[57] ABSTRACT

The invention relates to a grazing angle microscope for spectroscopic applications. A novel light path having two shifting planar mirrors permits spectroscopic investigation of a sample area off the optical microscope axis at grazing angles as well as visual viewing at steeper angles of incidence of the light.

9 Claims, 2 Drawing Sheets

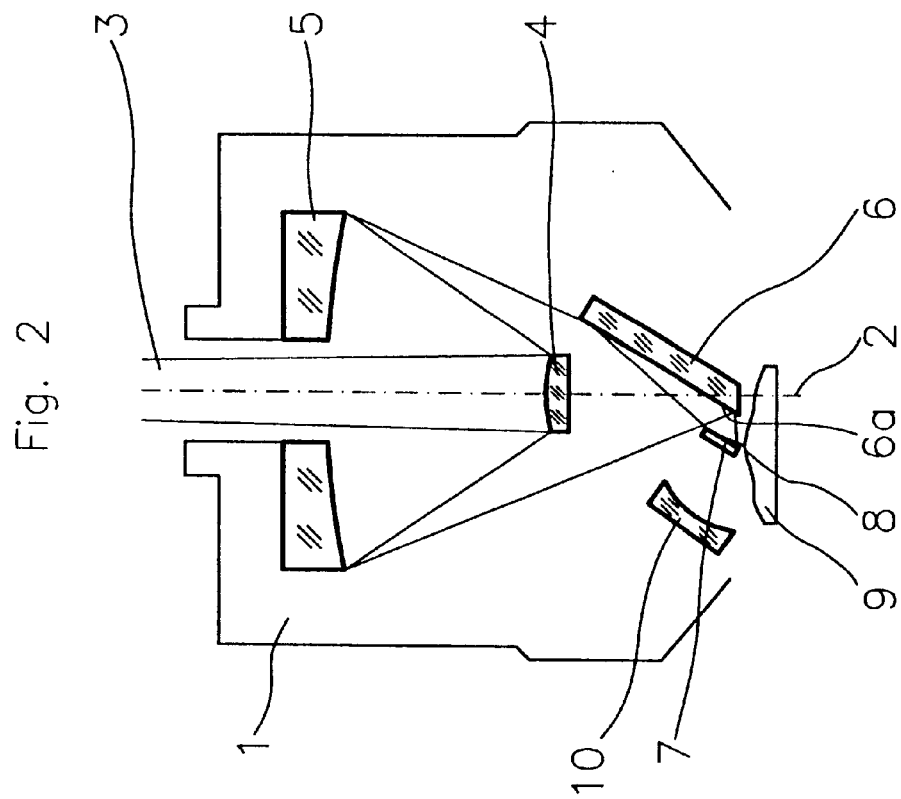
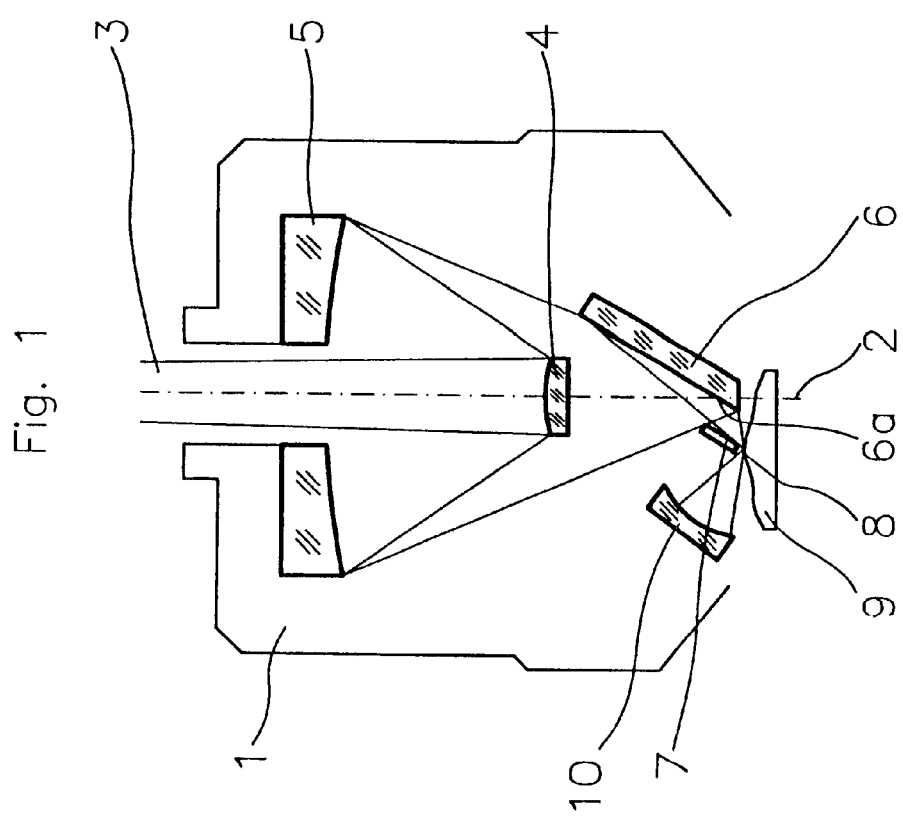

GRAZING ANGLE MICROSCOPE

This application claims Paris Convention priority of German patent application number 197 48 552.9 filed Nov. 4, 1997, the complete disclosure of which is hereby incorporated by reference.

BACKGROUND OF THE INVENTION

The invention concerns a grazing angle microscope, in particular for use in connection with an infrared spectrometer, with a sample in a sample plane and optical means to, in a measuring configuration, either direct light under grazing incidence onto a small area of the sample surface and to guide the light reflected from this area to a detector and optical means to, in a viewing configuration, alternatively direct light at a steeper range of incident angles, preferably including orthogonal incidence, onto the same small area and to guide the light thereby reflected to viewing means.

Such a grazing angle microscope is known from U.S. Pat. No. 4,810,077 the entire disclosure of which is hereby incorporated by reference.

Many spectroscopic applications in industry and science require that sample surfaces be illuminated at grazing incidence. This means that the angle of incidence between the incident light beam and the normal to the sample plane is very large, i.e. larger than 60 degrees, usually larger than 80 degrees. The light reflected at grazing angles from the surface is guided to a detector of, for example, a Fourier transform infrared spectrometer (FTIR spectrometer).

In this context, if is often desirable to first visually view the area to be analyzed, to limit the area by means of a mask and then to measure the spectrum of this particular small area of the surface. The selectable area visible in the microscope should thereby coincide with the area investigated spectroscopically.

In the conventional grazing angle microscope, a sample surface is illuminated and viewed at grazing angles. By means of a mask, an enlarged image of a surface area with arbitrary geometrical contour can be selected and this area can be investigated spectroscopically. The microscope uses an objective for grazing incidence, wherein light, or more generally, electromagnetic radiation, first impinges on a central convex mirror on the optical microscope axis, is reflected by this mirror onto a concave, ring-shaped mirror and from this location is incident under grazing incidence on a small area of the sample surface. The reflected radiation emerging at grazing angles of reflection is first once more reflected from a ring-shaped concave mirror onto a second convex mirror and then reaches a detector for measurement. The small area investigated can be selected via a mask. Towards this end, either the incident or the reflected light is focused onto an adjustable mask at an intermediate focus to keep undesired light outside of the selected area of the surface. Along a second light path, coincident downstream of the mask with the one just described, separate illuminating light can be introduced with which the area on the surface can be selected, illuminated and viewed. The two convex and concave mirrors are each preferably manufactured as integral parts, so that both convex mirrors as well as both concave mirrors form a single component.

As already indicated above, in the present invention the expression "light" is not limited to the visible range but generally comprises electromagnetic radiation that can be focused by the optical components described. In particular, the infrared range is included. This is mainly relevant for the light that reaches the detector but also for the light that serves for visual viewing, which can be performed with a conventional ocular but also e.g. by attaching a video camera, which can also operate in the infrared range. Therefore, in principal, both the same as well as different light sources may be used for visual viewing and spectroscopy. In IR spectroscopy, it is common to switch light sources (and detectors) depending on the wavelength range, e.g. by shifting deflection mirrors. Clearly, this can also be done when switching to a separate viewing mode. Towards this end, it is particularly important that the selected surface area coincides in the viewing and measuring modes.

In order to make full use of the possibilities of measurements at grazing reflection it is necessary to employ polarized light. The band intensities of thin films on metal surfaces have strong p-polarization but extremely weak s-polarization.

There is therefore a need for a grazing angle microscope for spectroscopy of the above-mentioned kind, which permits use of polarized light.

SUMMARY OF THE INVENTION

The need is addressed in accordance with the invention in that the small area is located displaced from the optical axis of the grazing angle microscope.

In particular, the need is satisfied in the measuring configuration in that light is incident essentially along the optical axis of the grazing angle microscope, is back reflected by a convex mirror onto a concave mirror to then impinge upon a first planar mirror, whose reflecting surface is pierced by the optical axis at an angle of less than 90 degrees, the planar mirror being asymmetrically disposed with respect to that optical axis to reflect the light at grazing angles which then passes, via a second planar mirror, onto the small area on the sample surface, wherein the small area is located outside the optical axis. The light reflected at grazing angles from the small area is incident on a concave mirror, is thereby essentially back reflected a second time onto the small area, with the light which is reflected a second time at grazing angles by the small area being emitted along an inverted light path, via the first planar mirror, the concave mirror, and the convex mirror essentially parallel to the optical axis and guided to the detector. In a viewing mode, the first and second planar mirrors are shifted, such that light is incident essentially parallel to the optical axis of the grazing angle microscope, is back-reflected by the convex mirror onto the concave mirror, is then incident on the first planar mirror which directs the light on the second planar mirror, and then onto the small area on the sample surface. The light reflected by the small area travels back onto the second planar mirror and is emitted from this location along an essentially inverted return light path, via the first planar mirror, the concave mirror and the convex mirror essentially parallel to the optical axis to be guided to the viewing means.

With this arrangement, in particular, polarized measurements are possible. Since the measuring light is reflected twice by the sample surface, the band depth is, in addition, doubled.

Clearly, as with prior art grazing angle microscopes or in other known infrared microscopes without grazing angle incidence, the area of interest on the sample surface can be selected by masks at an intermediate focus prior to and/or after reflection from the sample. The inserted, if necessary variable, mask is identical for the measuring configuration and the viewing configuration: i.e. measuring and viewing light paths are, at least in part, identical. It is thereby nevertheless possible to use different light sources and to switch between these as well as between a measuring detector and viewing means.

The focal lengths of the above-mentioned optical components are chosen such that the light is essentially focused onto the small selected area on the sample surface both in the measuring configuration as well as in the viewing configuration.

In certain cases, the possibility of shifting the planar mirrors can be omitted in embodiments, so that viewing also takes place at grazing angles. In this case, one switches only between the detector and the viewing means and, in the event of two light sources, between the measuring light and the viewing light. In this case, the planar mirrors always stay fixed in the "measuring configuration". Although this impairs the depth of focus in the viewing mode, this may be accepted since the arrangement is simpler.

Further details of the invention are apparent from the following figures and may be derived therefrom. Clearly, these figures can be used individually or in combination without departing from the scope of the invention.

BRIEF DESCRIPTION OF THE DRAWING

FIG. 1 shows a simplified cross-section of the light path in a grazing angle microscope according to the invention in the measuring configuration;

FIG. 2 shows a simplified cross-section of the light path in a grazing angle microscope according to the invention in the viewing configuration.

DESCRIPTION OF THE PREFERRED EMBODIMENT

Figure 3:
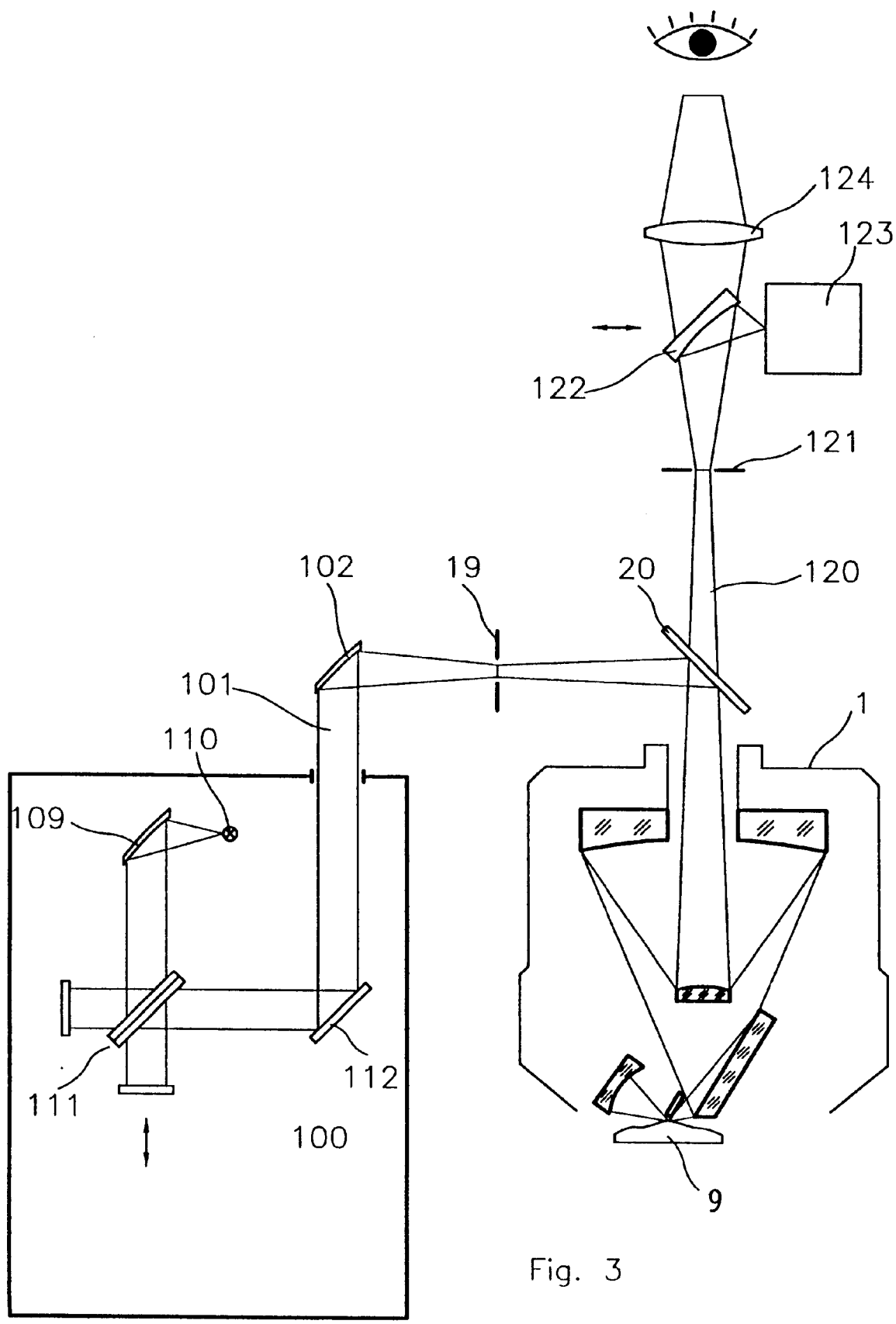
FIG. 3 shows an infrared spectrometer with a grazing angle microscope according to the invention.

FIG. 1 shows, in detail, a section of a grazing angle microscope 1 in a measuring configuration. Light bundle 3 is incident on central convex mirror 4 along optical axis 2 and is thereby reflected back at an angle between 90 degrees and 180 degrees, to then impinge onto ring-shaped concave mirror 5, which deflects the light bundle past convex mirror 4 onto movable planar mirror 6. The reflecting surface 6a of planar mirror 6 is pierced by optical axis 2 but is titled with respect to this axis 2 and arranged asymmetrically with respect to axis 2. From this planar mirror 6, the light bundle 3 passes to a second smaller planar mirror 7 and is directed at grazing angles of incidence onto small selected area 8, displaced from optical axis 2, on the surface of sample 9. The focal lengths of the above-mentioned optical components 4, 5, 6 are chosen such that the light bundle 3 is essentially focused onto the small selected area 8 (off optical axis 2). Grazing incidence at the sample surface means that the angle between incident light bundle 3 and the sample 9 surface is very small, at least smaller than 30 degrees, usually a few degrees. The divergent light reflected by the sample surface impinges on a curved mirror 10 and is back-reflected onto area 8 of sample 9, where it is reflected and passes along the inverted incident light path to planar mirror 6, concave mirror 5 and convex mirror 4. It finally exits essentially along optical axis 2. As is conventional in the grazing angle microscopes mentioned above and also in a number of other prior art infrared microscopes, adjustable masks are disposed in the incident and/or reflected light path which are imaged onto the sample surface to select the area 8 on the sample surface. The incident light originates from a light source, usually the light source of an IR spectrometer. The reflected light bundle is guided to a detector, generally of an IR spectrometer. These aspects of the grazing angle microscope according to the invention are completely conventional. Therefore, further details are omitted here for the sake of clarity.

FIG. 2 shows the same section 1 of a grazing angle microscope according to the invention in a viewing configuration. The light path of incident light bundle 3 to plane mirror 6 is identical to FIG. 1. However, in the configuration of FIG. 2, planar mirror 6 and planar mirror 7 are shifted by a small distance perpendicular to the optical axis, so that now light bundle 3 is not guided directly onto the sample 9 but first onto the—also slightly shifted—planar mirror 7 and focused from this location at a non-grazing, relatively steep angle (usually at right angles) onto the selected area 8 of sample 9. In this viewing mode, curved mirror 10 is no longer reached by the light bundle 3. The light reflected by the selected area now passes under inversion of the incident light path via planar mirror 6, concave mirror 5, convex mirror 4 along optical axis 2. The reflected light bundle reaches an ocular or a video camera for visual viewing of the selected area via further optical components (not shown). As mentioned earlier, this area can be varied by adjustment or exchange of one or more masks in the incident and/or reflected light path. Clearly, this area can be shifted along the sample surface by moving the sample. These are all components and methods used in the field of IR microscopy. Further discussion and illustration with regard to FIGS. 1 and 2 is therefore not needed.

The investigated area 8 is therefore measured spectroscopically at grazing angles but viewed with conventionally incident light.

Use of curved mirror 10 in the measuring mode results in the light being reflected at grazing angles twice from area 8, advantageously doubling the band depth.

An additional polarizing filter may be inserted into the incident and/or reflected light path. This polarizing filter transmits only one, usually linearly polarized, component of the light. The band intensity of thin films on metal surfaces is very strong in p-polarization, but extremely weak in s-polarization. The inserted polarizing filter can be used to select the polarization component that yields strongest band intensity. In this way, detection sensitivity can be considerably improved. Use of polarized light in the design of a conventional grazing angle microscope does not yield satisfying results since, in consequence of the axially symmetric arrangement, the position of the plane of incidence with respect to the polarization component changes for every beam such that no polarization direction can be selected. Therefore, the sensitivity increasing effect of polarized measurements cannot be made use of in these designs.

FIG. 3 schematically shows a Fourier transform infrared spectrometer 100 with a grazing angle microscope 1 according to the invention. A light beam from light source 110 enters the interferometer 111 of the spectrometer 100 via a mirror 109. The measuring beam 101 exiting spectrometer 100 via mirror 112 is imaged via a mirror 102 onto a mask 19. The radiation transmitted by mask 19 is reflected via a beam splitter 20 parallel to the optical axis 1 of grazing angle microscope 1 and passes through grazing angle microscope 1 as described above in connection with FIGS. 1 and 2. The light beam 120 reflected by sample 9 is guided to either a detector 123 or an ocular 124 via a further mask 121 and a movable mirror 122. Both masks 19 and 121 can be adjustable with respect to a selected field of view to selectively examine a small area of sample 9. Alternative light paths of an infrared microscope are commonly known, e.g. from U.S. Pat. No. 4,594,509, the entire disclosure of which is hereby incorporated by reference.

I claim:

1. An optical system for passing optical radiation at grazing incidence onto a small area of a sample and for passing optical radiation, reflected from the small area following grazing incidence, onto a detector, the optical system for passing optical radiation at non-grazing incidence onto the small area and for passing optical radiation reflected from the small area following non-grazing incidence to viewing means, the optical system comprising:

a grazing angle microscope having an optical axis; and optical means for passing the optical radiation within said grazing angle microscope to the small area and for passing optical radiation within said grazing angle microscope from said small area to the viewing means and to the detector, wherein the small area is displaced from the optical axis.

2. The optical system of claim 1, wherein said optical means comprise;

a convex mirror aligned along the optical axis for reflecting incident optical radiation along a first optical path to the small area and along a second optical path to the small area and for passing optical radiation reflected from the small area along a third optical path to the detector and for passing optical radiation reflected from the small area along a fourth optical path to the viewing means;

a first concave mirror aligned along the optical axis for reflecting optical radiation from said convex mirror along said first and second optical path and for reflecting optical radiation along said third and fourth optical path to said convex mirror;

a first planar mirror having a reflecting surface intersecting the optical axis at an angle of less than 90° and disposed asymmetrically with respect thereto, said first planar mirror for reflecting optical radiation from said first concave mirror at grazing angles along said first and said second optical path and for reflecting optical radiation along said third and said fourth optical path to said first concave mirror;

a second planar mirror disposed off the optical axis, said second planar mirror for reflecting optical radiation from said first planar mirror along said first optical path onto the small area of the sample at grazing angles, for reflecting optical radiation from said first planar mirror along said second optical path onto the small area, and for reflecting optical radiation along said fourth optical path to said first planar mirror;

means for displacing said first and said second planar mirrors between a detecting mode, in which optical radiation passes along said first optical path to the small area and along said third optical path to the detector, and a viewing mode, in which the optical radiation passes along said second optical path to the small area and along said fourth optical path to the viewing means; and a second concave mirror for reflecting optical radiation from the small area back onto the small area along said first optical path.

3. The optical system of claim 1, wherein said optical means comprises means for polarizing the optical radiation.

4. The optical system of claim 2, further comprising an adjustable mask to pass the optical radiation along said first and said second optical path for defining the small area.

5. The optical system of claim 4, wherein said adjustable mass passes the optical radiation along said third and said fourth optical path.

6. The optical system of claim 1, further comprising an infrared spectrometer having a first light source and a first detector.

7. The optical system of claim 6, wherein said infrared spectrometer comprises an interferometer.

8. The optical system of claim 6, wherein said infrared spectrometer comprises a second light source and a second detector and further comprising means for switching among said first light source, said first detector, said second light source, and said second detector.

9. The optical system of claim 8, wherein said first light source for a measuring configuration and said second light source for a viewing configuration.

* * * * *